(12) United States Patent
Brasch et al.

(10) Patent No.: US 7,125,532 B2
(45) Date of Patent: Oct. 24, 2006

(54) PROCESS FOR THE MANUFACTURE OF DISPERSIBLE ALUMINO-SILICATES

(75) Inventors: Andrea Brasch, Meldorf (DE); Klaus Diblitz, Hamburg (DE); Arnold Meyer, St. Michaelisdonn (DE)

(73) Assignee: Sasol Germany GmbH, Hamburg (DE)

( * ) Notice: Subject to any disclaimer, the term of this patent is extended or adjusted under 35 U.S.C. 154(b) by 534 days.

(21) Appl. No.: 10/054,830

(22) Filed: Jan. 23, 2002

(65) Prior Publication Data

US 2002/0098142 A1 Jul. 25, 2002

Related U.S. Application Data

(63) Continuation of application No. 09/269,989, filed on May 1, 2000, now abandoned.

(30) Foreign Application Priority Data

Oct. 5, 1996 (DE) ................ 196 41 142

(51) Int. Cl.
 *C01B 33/26* (2006.01)
(52) U.S. Cl. ................ 423/328.1; 423/328.2
(58) Field of Classification Search ........... 423/328.1, 423/328.2
See application file for complete search history.

(56) References Cited

U.S. PATENT DOCUMENTS

| 2,974,108 A | 3/1961 | Alexander |
| 3,933,621 A | 1/1976 | White et al. |
| 4,438,012 A | 3/1984 | Kuhling et al. |
| 4,590,289 A | 5/1986 | Albert et al. |
| 5,045,519 A | 9/1991 | Meyer et al. |
| 5,346,681 A | 9/1994 | Pachaly et al. |
| 5,834,572 A | 11/1998 | Derleth et al. |
| 5,883,272 A | 3/1999 | Noweck et al. |
| 6,030,599 A | 2/2000 | Noweck et al. |
| 6,245,310 B1 * | 6/2001 | Brasch et al. ............ 423/328.1 |

FOREIGN PATENT DOCUMENTS

| CA | 848966 | | 8/1970 |
| DE | 196 41 142 | * | 4/1998 |
| EP | 0669162 | | 8/1995 |
| FR | 2243020 | | 4/1975 |
| FR | 2527196 | | 11/1983 |
| GB | 2166971 | | 4/1985 |
| JP | 58199711 | | 11/1983 |
| JP | 1197311 | | 8/1989 |

OTHER PUBLICATIONS

Translation of DE 196 41 142, published Apr. 16, 1998.*

* cited by examiner

*Primary Examiner*—Christina Johnson
(74) *Attorney, Agent, or Firm*—C. James Bushman; Browning Bushman P.C.

(57) ABSTRACT

Process for the manufacture of high-purity alumino-silicates which are dispersible in aqueous and/or aqueous-acidic media by hydrolysis of aluminum compounds and organo-silicon compounds.

19 Claims, No Drawings

PROCESS FOR THE MANUFACTURE OF DISPERSIBLE ALUMINO-SILICATES

CROSS-REFERENCE TO RELATED APPLICATIONS

This application is a continuation of U.S. application Ser. No. 09/269,989, filed on May 1, 2000 now abandoned.

The present invention relates to a process for the manufacture of high-purity alumino-silicates which are dispersible in aqueous or aqueous-acidic media by hydrolysis of aluminium compounds and organosilicon compounds.

There exists a large number and wide variety of natural alumino-silicates, including many compounds having defined crystalline structures, such as muscovite, nepheline, and chabasite. When exchanging part of the silicon atoms in the reticulation of silicates for aluminium atoms, without destroying the reticulation, zeolites are obtained.

Besides natural alumino-silicates, there are many synthetic products of this kind. Such products may be those defined by crystal chemistry or may be physical mixtures of aluminium hydroxide and silicic acids with different quantities of water. Besides physical mixtures, alumino-silicate defined by crystal chemistry may be present as well.

A customary process for preparing such alumino-silicates is the conversion of clays, such as kaolin, using silicic acid and sodium hydroxide. Another synthesis route is the cogelation of aluminium hydroxide sols with silicic acid sols followed by precipitation [cf. GB 2166971-C]. Precipitation of an aluminium salt in a silicic acid sol is known as well [cf. CA 848966-A].

The aforesaid processes have the disadvantage that the desired sols or emulsions only exist at the instant they are prepared, while the powder obtained by subsequent drying can only incompletely be dispersed or requires solvent mixtures to achieve dispersion. Another disadvantage is that the sols or emulsions prepared in this way contain large quantities of alkali metals or alkaline earth metals used for stabilising the silicic acid. Subsequent purification, e. g. by ion exchange, is incomplete and results in typical concentrations of alkali metals or alkaline earth metals of 0.1% (equal to 1,000 ppm) after purification [cf. U.S. Pat. No. 3,933,621].

Heterogeneous catalysis requires high-purity catalyst supports containing less than 100 ppm of alkali metals and/or alkaline earth metals, particularly less than 50 ppm of sodium oxide. The preparation of such high-purity alumino-silicates using ion exchanged ortho-silicic acid is described in German patent DE 38 39 580-C1. The resultant alumino-silicates have the desired high purities, but they cannot be dispersed.

Alumino-silicates are physically/chemically not comparable with aluminium hydroxides. For instance, their surfaces have higher acidities due to the stronger Lewis acid character of silicic acid. This property is utilized for a large number of catalytic processes, such as desulfurizing, denitrification, oxidation, hydrocracking, and mild hydrocracking.

Modem catalysts often consist of many different support materials [for instance, cf. GB 2166971-C]. It is essential that the catalyst support materials be homogeneously mixed to ensure uniform compositions. Therefore, dispersible alumino-silicates offer several advantages, e. g. when used for coating substrates. This method can be used in the field of catalysis and materials coating. The explanations given hereinabove show that there is a need for dispersible high-purity alumino-silicates.

It was the object of this invention to develop a synthesis for preparing dispersible alumino-silicates which offers the following advantages:

Even after drying and conversion into powder, the alumino-silicates prepared according to the present invention shall be dispersible in aqueous solutions without addition of or treatment with organic solvents.

The alumino-silicates prepared according to the present invention shall have high purities.

The starting materials used for preparing the aforesaid compounds shall be readily available.

The Si/Al ratio of the product shall be adjustable by varying the educt ratio and without using one of the components in excess.

The price of the starting materials shall allow an economic process.

The manufacturing process shall be feasible both as a continuous and discontinuous process.

It was surprisingly found that the process described hereinbelow provides alumino-silicates which solve the problems the present invention was based on.

The instant invention relates to a process for the continuous or discontinuous manufacture of high-purity alumino-silicates which can be dispersed in aqueous and/or aqueous-acidic media. The desired properties are obtained by the following process:

Process for the manufacture of alumino-silicates which are dispersible in aqueous and/or aqueous-acidic media wherein (A) one or more hydrolyzable aluminium compound(s) and (B) one or more hydrolyzable organosilicon compound(s)

is (are) hydrolyzed. The components are hydrolyzed jointly. Alternatively, they can be hydrolyzed consecutively or separately. In the latter case, the (partial) reaction products will be combined after the (partial) hydrolysis.

Hydrolyzable compounds within the meaning of the instant invention are all the aluminium compounds or organosilicon compounds forming M—OH and/or M—O—M structures when reacted with water, e. g. organosilicon compounds, such as silicones, alkyl silanes, alkyl alkoxysilanes, alkyl halogen silanes, alkoxyhydroxysilanes, or alkyl hydroxysilanes, or aluminium compounds, such as aluminium alcoholates, aluminium hydroxy-alcoholates, aluminium oxyalcoholates, aluminium acetyl acetonates, aluminium alkyl chlorides, or aluminium carboxylates. The hydrolysis may be carried out at 20 to 98° C., preferably 50 to 98° C., most preferably 85 to 98° C.

Preferably, compounds of the type $M(O—R—A—R')_{z-n}(O—R'')_n$ are employed, wherein independent of each other and, optionally, different for each residue M is aluminium or silicon, R" is a branched or an unbranched, a cyclic or an acyclic, or an aromatic hydrocarbon residue having 1 to 30, particularly 2 to 12 carbon atoms, R' is a branched or an unbranched, a cyclic or an acyclic, or an aromatic hydrocarbon residue having 1 to 10 carbon atoms, particularly an alkyl residue having 4 to 8 carbon atoms, R is a bivalent and branched or unbranched, cyclic or acyclic, or aromatic $C_1$ to $C_{10}$ hydrocarbon residue, particularly an alkyl residue having 1 to 5 carbon atoms, most preferably 1 to 3 carbon atoms, the latter one most preferably being unbranched and acyclic, A represents a heteroatom of main group 6 (oxygen group) or main group 5 (nitrogen group) of the periodic system, preferably oxygen or nitrogen, wherein, if A represents an element of main group 5, A bears hydrogen or a $C_1$ to $C_{10}$ alkyl residue or a $C_6$ to $C_{10}$ aryl-/alkyl aryl residue as additional substituent(s) for the saturation of its valences, and n is an index for the numbers 0, 1, 2, or 3 if M is aluminium, or is an index for the numbers 0, 1, 2, 3, or 4 if M is silicon, and z is an index for the number 3 if M is aluminium, or is an index for the number 4 if M is silicon.

Preferably, n is equal to 0 or equal to 3 if M is aluminium. If M is silicon, n is preferably equal to 4. If n is equal to 0 and A is oxygen, metal trisbutylene glycolates are preferred. It is preferred that M be aluminium.

In case n is equal to 3, the aluminium compounds are aluminium trisalcoholates which, with increasing preference, have $C_2$ to $C_{12}$, $C_4$ to $C_8$, or $C_6$ to $C_8$ hydrocarbon residues, the residues being saturated or unsaturated, cyclic or acyclic, branched or unbranched, or aromatic, preferably saturated. Saturated, linear $C_6$ to $C_8$ hydrocarbon residues are particularly preferred. For example, hydrolyzable aluminium alcoholates may be prepared according to the process disclosed in EP 0 111 115-A1.

In case n is equal to 4, the hydrolyzable organosilicon compounds are silicon alcoholates. Preferred silicon alcoholates have $C_1$–$C_8$ hydrocarbon residues, the residues being saturated or unsaturated, cyclic or acyclic, branched or unbranched, or aromatic. Saturated $C_2$ to $C_4$ hydrocarbon residues are particularly preferred.

Furthermore, the process according to the instant invention is superior by the fact that, apart from the educts or products, the reaction can be carried out without any organic solvents and in an essentially aqueous or alcoholic/aqueous environment.

According to an embodiment of the present process, the hydrolyzable organosilicon compounds are prehydrolyzed or partially hydrolyzed prior to addition of the hydrolyzable or hydrolyzed aluminium compound with 0.5 to 3 moles of water, preferably 1 to 2 moles, per mole of silicon, i.e. less than the stoichiometric amount. Said partial hydrolysis is preferred, whenever the hydrolyzable aluminium compound is not of the type $Al(O—R—A—R')_{3-n}$ $(O—R'')_3$.

Prior to use, the hydrolyzable metal compounds may be purified by distillation, filtration, ion exchange and/or centrifugation.

In addition, dispersibility improves by several percent when the combined reaction products of the silicon and aluminium compounds are subjected during or after the hydrolysis to joint hydrothermal treatment in an aqueous environment at temperatures of 40 to 220° C. for a period of greater than 0.5 hour. In another embodiment of this process the hydrothermal ageing is performed during a period of 0.5 to 24 hours. Preferably, the treatment is performed at temperatures of 80 to 130° C. for a period of 1 to 20 hours, most preferably 5 to 20 hours.

Optionally, an acid may be present during the hydrothermal treatment. It is preferred that this acid be a monovalent organic $C_1$ to $C_6$ acid or a mono-valent inorganic acid (a monovalent mineral acid), such as HCl or $HNO_3$. The acid may also be added after the hydrolysis, but it should be added before drying and should be present during the hydrothermal treatment.

It can be used in quantities of 0.1 to 2.0 grams, preferably 0.2 to 0.8 gram, referring to 1 gram of solid material.

Within the meaning of the present invention, monovalent organic $C_1$ to $C_6$ acids are organic compounds which have at least 1 to 6 carbon atoms and show an acid reaction in the presence of water, i.e. react as proton donators, and which can set free only one proton, referring to the acid molecule. This definition includes for instance acid chlorides, sulfonic acids, and other organic compounds forming —COOH or —COO$^-$ groups in water.

The educts may be used in quantities of from 99.5 wt. %:0.5 wt. % to 50 wt. %:50 wt. %, preferably from 98 wt. %:2 wt. % to 50 wt. %:50 wt. %, each referring to the ratio of $Al_2O_3$:$SiO_2$. Bases, such as ammonia solution, may be added after the hydrolysis in order to achieve better separation of the organic phase. Furthermore, the reaction product of this invention can be calcined at temperatures of 550° C. to 1,500° C. for a period of 0.5 hour to 24 hours.

The dispersible alumino-silicates are useful as catalysts, catalyst supports for catalytic processes, for the manufacture of catalysts, as starting materials for ceramics, as coating materials, and as binder components and rheo-logical modifiers in aqueous systems.

The term 'dispersible alumino-silicates' as used in the present invention means dry and, most expediently, powdery alumino-silicates which can be dispersed in aqueous media in quantities of at least greater than 90 wt. %, preferably greater than 95 wt. %, i.e. greater than 90 wt. %. preferably greater than 95 wt. % of said products will remain dispersed after dispersion. In the experimental part described hereinbelow a method for quantifying the dispersibility is described. The resultant aqueous products can be dried using known methods, such as spray drying or by means of a rotary drier. The process for manufacturing alumino-silicates according to this invention can be carried out continuously or discontinuously.

The alumino-silicates of this invention can be dispersed using water-diluted acids, such as inorganic acids, e. g. hydrochloric acid, nitric acid, or $C_1$ to $C_6$ organic acids, monovalent acids being preferred. The acids used for dispersion can be employed in concentrations of 0.1 to 40 wt. %, referring to the straight acid. Preferably, lower concentrations are used, i. e. from 0.1 to 5 wt. %. In some cases it is also possible to use only water for dispersion.

The compounds manufactured according to this invention can be calcined in a furnace at temperatures of 550° C. to 1,500° C. for a period of 3 to 24 hours. The metal oxide manufactured in this way has the requisite high purity.

Table 1, following, shows several alumino-silicates manufactured according to the present invention and their dispersibilities D.

TABLE 1

| Compound | $Al_2O_3$:$SiO_2$ [wt. %] | $HNO_3$ [wt. %] | Ageing [h/° C.] | Dispersibility D [%] |
|---|---|---|---|---|
| 1 | 72.3:27.7 | 30.0 | — | 96 |
| 2 | 61.5:38.5 | 25.0 | — | 96 |
| 3 | 72.3:27.7 | 2.0 | 16 h/95° C. | 97 |
| 4 | 51.6:48.4 | 30.0 | — | 95 |
| 5 | 95.0:5.0 | 0.8 | 16 h/95° C. | 97 |
| 6 | 74.1:25.9 | 30 | — | 98 |
| A | 95.1:4.9 | 30 | — | nondispersible |
| B | 50.4:49.6 | 30 | — | nondispersible |
| C | 68.8:31.2 | 30 | 5 h/95° C. | nondispersible |

Legend:
Compounds A and B are conventionally produced alumino-silicates.
C is an alumino-silicate prepared from silicic acid and aluminium alcoholates, including hydrothermal treatment, but without addition of an acid.
A through C are reference substances; 10 weight percent of each solid alumino-silicate were dispersed.
* acid for dispersion Table 2, following, shows the physical data of the alumino-silicates according to this invention in comparison with two standard alumino-silicates (A and B). The reference alumino-silicates A and B were prepared by mixing an alumina sol with silicic acid.

TABLE 2

| Compound | $Al_2O_3:SiO_2$ [wt. %] | Surface [$m^2$/g] | Pore Volume [ml/g] |
|---|---|---|---|
| 1 | 72.3:27.7 | 426 | 0.41 |
| 2 | 61.5:38.5 | 406 | 0.35 |
| 3 | 72.3:27.7 | 315 | 0.22 |
| 4 | 51.6:48.4 | 303 | 0.31 |
| 5 | 95.0:5.0 | 527 | 0.73 |
| 6 | 74.1:25.9 | 500 | 0.62 |
| A | 95.1:4.9 | 314 | 0.54 |
| B | 50.4:49.6 | 452 | 0.60 |

The dispersible alumino-silicates manufactured according to this invention have high purities. In particular, the content of alkali metals and alkaline earth metals which have particularly adverse effects when using the aforesaid products for catalysis is very low. The results of the trace elements analysis by ICP spectroscopy are listed in Table 3. The purities listed in Table 3 can be further increased by using bidistilled water and containers made of inert materials.

TABLE 3

| Compound | $Na_2O$ [ppm] | $Li_2O$ [ppm] | MgO [ppm] | CaO [ppm] | $TiO_2$ [ppm] | $Fe_2O_3$ [ppm] |
|---|---|---|---|---|---|---|
| 1 | 13 | <5 | <10 | <10 | <50 | 12 |
| 2 | <10 | <5 | <10 | <10 | <50 | 48 |
| 4 | 16 | <5 | <10 | <10 | <50 | 63 |
| 5 | <10 | <5 | <10 | <10 | <50 | 28 |
| 6 | 12 | <5 | <10 | <10 | <50 | 35 |

Legend: The concentration of other elements, such as Pb, Zn, Ni, Cr, Cu, Mn, Mo, and Ga, is less than 50 ppm in total.

EXAMPLES (GENERAL)

The compounds prepared according to this invention were analysed for trace impurities by inductively coupled plasma (ICP) spectroscopy. The surfaces were determined by the BET method, while the pore volumes were additionally determined by mercury porosimetry (Autopore II 9220 porosimeter. Mikromeritics) and nitrogen porosimetry (Flow Prep 060, Gemini 2360, 2375, Mikromeritics). The compounds of this invention were calcined in a muffle furnace at temperatures of between 550° C. and 1,500° C. Deionised water was used for the hydrolysis.

The dispersibility D was determined by the following method. A certain amount of the dry, solid material was placed into a beaker and mixed with dilute acid, e. g. nitric acid, while stirring. Stirring was continued for 10 minutes (stirrer speed 800–850 rpm). The suspension thus obtained was quantitatively transferred to the glass tube of a centrifuge. Subsequent to centrifugation for 20 minutes at 2,400 $rpm^{-1}$, the supernatant was decanted, and the residue in the glass tube was dried for at least 0.5 hour at 573 K (300° C.). The glass tube then was weighed including the residue, and thereafter without residue. The difference obtained is the weight of nondispersed solid.

$$\text{Nondispersed quantity, \%} = \frac{\text{gram of residue} \times 100}{\text{initial weight of alumina, in grams}}$$

Dispersed quantity $D$, % = 100 − percentage of nondispersed quantity

Example 1 (Compound 1)

Into a 1,000-ml three-neck flask, there were placed 136.4 grams of silicon tetraethanolate (14.25 wt. %). The contents was heated to 90° C. Addition of 11.8 grams of 1% nitric acid resulted in moderate precipitation. After stirring for 1 hour, 400 grams of aluminium trishexanolate (6.3 wt. %) were added. Then, this mixture was added in three portions to 686 grams of water heated to 90° C. in order to perform the hydrolysis. Hydrolysis took 1 hour. During this period, after 40 minutes, 8.4 grams of 25% ammonia solution were added to facilitate phase separation. The supernatant alcohol was decanted and the remaining aqueous phase was liberated from alcohol residue by steam distillation, followed by spray drying.

Example 2 (Compound 2)

Into a 1,000-ml three-neck flask, there were placed 212 grams of silicon tetraethanolate (14.25 wt. %). The contents was heated to 90° C. Addition of 18.4 g of 1% nitric acid resulted in moderate precipitation. After stirring for 1 hour, 400 grams of aluminium trishexanolate (6 wt. %) were added. Then, this mixture was added in three portions to 778 grams of water heated to 90° C. in order to perform the hydrolysis. Hydrolysis took 1 hour. During this period, after 40 minutes, 9.6 grams of 25% ammonia solution were added to facilitate phase separation. The supernatant alcohol was decanted and the remaining aqueous phase was liberated from alcohol residue by steam distillation, followed by spray drying.

Example 3 (Compound 3)

Into a 1,000-ml three-neck flask, there were placed 179 grams of silicon tetraethanolate (14.25 wt. %). The contents was heated to 90° C. Addition of 15.5 g of 1% nitric acid resulted in moderate precipitation. After stirring for 1 hour, 500 grams of aluminium trishexanolate (6.3 wt. %) were added. Then, this mixture was added in three portions to 883 grams of water heated to 90° C. in order to perform the hydrolysis. Hydrolysis took 1 hour. After addition of 8.5 grams of $HNO_3$ (65 wt. %), ageing was performed at 95° C. for 16 hours. The supernatant alcohol was decanted and the remaining aqueous phase was liberated from alcohol residue by steam distillation, followed by spray drying.

Example 4 (Compound 4)

Into a 1,000-ml three-neck flask, there were placed 318 grams of silicon tetraethanolate (14.25 wt. %). The contents was heated to 90° C. Addition of 27.5 g of 1% nitric acid resulted in moderate precipitation. After stirring for 1 hour, 400 grams of aluminium trishexanolate (6.3 wt. %) were added. Then, this mixture was added in three portions to 870 grams of water heated to 90° C. in order to perform the hydrolysis. Hydrolysis took 1 hour. During this period, after 40 minutes, 11 grams of 25% ammonia solution were added to facilitate phase separation. The supernatant alcohol was decanted and the remaining aqueous phase was liberated from alcohol residue by steam distillation, followed by spray drying.

Example 5 (Compound 5)

In a 1,000-ml three-neck flask, there were mixed 550 grams of aluminium trisbutylene glycolate (Al content 5.6 wt. %) and 21.4 grams of silicon tetraethanolate (14.25 wt. %). This mixture was added in three portions to 735 g of water and 6.2 g of $HNO_3$ (65 wt. %) heated to 75° C. in order to perform the hydrolysis. Hydrolysis took 1 hour. After phase separation, the supernatant organic phase was decanted. The aqueous phase was heated to 95° C. and maintained at this temperature for 16 hours. The alcohol in the aqueous phase was eliminated by steam distillation, followed by spray drying.

Example 6 (Compound 6)

In a 1,000-ml three-neck flask, there were mixed 200 grams of aluminium trisethylglycolate (Al content 6.8 wt. %) and 38.6 grams of ethyl glycol with 38.6 grams of silicon tetraethanolate (28.5 wt. %). This mixture was added in three portions to 360 g of water heated to 30° C. in order to perform the hydrolysis. Hydrolysis took 1.5 hours. Then, 4.4 grams of 25% ammonia solution were added. After phase separation, the supernatant organic phase was decanted. The alcohol in the aqueous phase was eliminated by steam distillation, followed by spray drying.

Example 7 (Comparative Example Compound C)

Into a 2,000-ml three-neck flask, there were placed 638 grams of aqueous silicic acid. The contents were heated to 75° C. A total of 500 grams of aluminium trishexanolate (Al content 6.35 wt. %) were added in three portions at time intervals of 15 minutes. After stirring for 30 minutes, the alcohol was decanted and the residue was diluted to a solids content of 5%. The sol was heated to 95° C. and maintained at this temperature for 5 hours. The remaining aqueous phase was liberated from alcohol residue by steam distillation, followed by spray drying.

The invention claimed is:

1. A process for the production of an aqueous/aqueous-acidic dispersion of an alumino-silicate comprising:
   hydrolyzing jointly or separately from each other in space or time at least one hydrolyzable aluminum compound and at least one hydrolyzable organosilicon compound, at a temperature of from 50 to 98° C., wherein the alumninum compound/silicon compound ratio is from 99.5 wt. %:0.5 wt. % to 50 wt. %:50 wt. %, each referring to $Al_2O_3:SiO_2$:;
   during or after the hydrolysis subjecting the hydrolysis reaction products to hydrothermal aging in an aqueous/aqueous-acidic media at a temperature of from 80 to 220° C. for a period of time greater than 0.5 hour;
   recovering a dry powder of the aged alumino-silicate; and
   dispersing the alumino-silicate powder in an aqueous/aqueous-acidic media is an amount of greater than 90% wt. without the addition of or treatment with any organic solvent.

2. A process according to claim 1, characterized in that the hydrolyzable compounds of claim 1 are compounds of the type $M(O-R-A-R^1)_{z-n}(O-R'')_n$, wherein independent from each other
   M is an aluminium or silicon,
   R" is a hydrocarbon residue having 1 to 30 carbon atoms,
   R' is a hydrocarbon residue having 1 to 10 carbon atoms,
   R is a bivalent hydrocarbon residue having 1 to 10 carbon atoms, and
   A represents a heteroatom of the main group 6 (oxygen group) or the main group 5 (nitrogen group) of the periodic system wherein, if A represents an element of the main group 5, A bears hydrogen or a $C_1$ to $C_{10}$ alkyl residue or a $C_6$ to $C_{10}$ aryl/alkyl aryl residue as additional substituents for the saturation of its valences, and
   n is an index for the numbers 0, 1, 2, or 3 if M is aluminum, or is an index for the numbers 0, 1, 2, 3, or 4 if M is silicon, and
   z is an index for the number 3 if M is aluminum, or is an index for the number 4 if M is silicon.

3. A process according to claim 2, characterized in that n is equal to 0.

4. A process according to claim 2, characterised in that n is equal to 3 if M is aluminum and/or n is equal to 4, if M is silicon.

5. A process according to any one of claims 1, 2 or 4, characterised in that silicon alcoholates having $C_1$ to $C_8$ hydrocarbon residues are used as hydrolyzable silicon compounds.

6. A process according to any one of claims 1, 2 or 4, characterised in that prior to addition of the hydrolyzable aluminum compound, the hydrolyzable silicon compound is prehydrolyzed with water or dilute acid using 0.5 to 3 moles of water per mole of silicon, namely, less than the stiochiometric amount.

7. A process according to any one of claims 1, 2 or 4, characterized in that aluminum alcoholates having $C_2$ to $C_{12}$ hydrocarbon residues are used as hydrolyzable aluminum compounds.

8. A process according to any one of claims 1, 2 or 4, characterised in that the hydrolysis is performed at 50 to 98° C.

9. A process according to any one of claims 1, 2 or 4, characterised in that the hydrothermal ageing is conducted for a period of 0.5 hour to 24 hours.

10. A process according to any one of claims 1, 2 or 4, characterised in that the acid is added after the hydrolysis and prior to hydrothermal treatment.

11. A process according to any one of claims 1, 2 or 4, characterised in that the acid which is present during or after the hydrolysis is a monovalent organic $C_1$ to $C_6$ acid or a monovalent mineral acid.

12. A process according to any one of claims 1, 2 or 4, characterised in that the hydrolyzable metal compounds are purified prior to use by distillation, filtration, or centrifugation and/or arc liberated from metal ions by ion exchange.

13. A process according to any one of claims 1, 2 or 4, characterised in that the reaction product of the invention is calcined at temperatures of from 550° C. and 1500° C. for a period of 0.5 hour to 24 hours.

14. A process according to claim 7 wherein the aluminum alcoholates have from $C_4$ to $C_8$ hydrocarbon residues.

15. A process according to claim 7 wherein the aluminium alcoholates have saturated $C_6$ to $C_8$ hydrocarbon residues.

16. A process according to claim 8 wherein the hydrolysis is performed at a temperature of from 85 to 90° C.

17. A process according to claim 9 wherein the hydrothermal aging is conducted for a period of from 1 to 20 hours.

18. A process according to claim 5 wherein the silicon alcoholates have $C_2$ to $C_4$ hydrocarbon residues.

19. A process according to claim 5 wherein the hydrocarbon residues are saturated.

* * * * *